(12) United States Patent
Cathro

(10) Patent No.: US 9,064,043 B2
(45) Date of Patent: Jun. 23, 2015

(54) FAULT REPLAY SYSTEM AND METHOD

(75) Inventor: Ian A. Cathro, Dundee (GB)

(73) Assignee: NCR Corporation, Duluth, GA (US)

( * ) Notice: Subject to any disclaimer, the term of this patent is extended or adjusted under 35 U.S.C. 154(b) by 201 days.

(21) Appl. No.: 12/339,729

(22) Filed: Dec. 19, 2008

(65) Prior Publication Data

US 2010/0162050 A1    Jun. 24, 2010

(51) Int. Cl.
| | |
|---|---|
| *G06F 11/00* | (2006.01) |
| *G06F 11/34* | (2006.01) |
| *G06F 11/30* | (2006.01) |
| *G06F 11/26* | (2006.01) |
| *G06F 11/36* | (2006.01) |

(52) U.S. Cl.
CPC ........ *G06F 11/3476* (2013.01); *G06F 11/3013* (2013.01); *G06F 11/3457* (2013.01); *G06F 11/261* (2013.01); *G06F 11/3636* (2013.01); *G06F 11/366* (2013.01)

(58) Field of Classification Search
CPC . G06F 11/261; G06F 11/263; G06F 11/3476; G06F 11/366; G06F 11/3013; G06F 11/3457
USPC .................................................. 714/39, 45
See application file for complete search history.

(56) References Cited

U.S. PATENT DOCUMENTS

| | | | | |
|---|---|---|---|---|
| 6,543,011 | B1* | 4/2003 | Schumacher et al. | 714/45 |
| 6,802,054 | B2* | 10/2004 | Faraj | 717/128 |
| 7,171,586 | B1* | 1/2007 | Gross et al. | 714/26 |
| 7,213,113 | B2* | 5/2007 | Sahin et al. | 711/162 |
| 7,568,131 | B2* | 7/2009 | Vertes | 714/45 |
| 8,423,164 | B2* | 4/2013 | Jaeger | 700/94 |
| 2002/0097715 | A1* | 7/2002 | Roerick | 370/389 |
| 2003/0140282 | A1* | 7/2003 | Kaler et al. | 714/39 |
| 2004/0100507 | A1* | 5/2004 | Hayner et al. | 345/855 |
| 2005/0198300 | A1* | 9/2005 | Gong et al. | 709/227 |
| 2006/0101476 | A1* | 5/2006 | Robert | 719/328 |
| 2007/0124437 | A1* | 5/2007 | Chervets | 709/223 |
| 2007/0192700 | A1* | 8/2007 | Sengar | 715/733 |
| 2007/0226438 | A1* | 9/2007 | Erofeev | 711/162 |
| 2007/0271273 | A1* | 11/2007 | Cradick et al. | 707/10 |
| 2008/0077686 | A1* | 3/2008 | Subhraveti | 709/224 |
| 2008/0155356 | A1* | 6/2008 | Boskovic et al. | 714/45 |
| 2008/0276129 | A1* | 11/2008 | Cocker et al. | 714/45 |
| 2009/0104954 | A1* | 4/2009 | Weber et al. | 463/1 |
| 2009/0106278 | A1* | 4/2009 | Ramacher et al. | 707/100 |
| 2009/0119549 | A1* | 5/2009 | Vertes | 714/47 |
| 2009/0328044 | A1* | 12/2009 | Bergheaud et al. | 718/101 |
| 2010/0049738 | A1* | 2/2010 | Mathur et al. | 707/104.1 |

* cited by examiner

*Primary Examiner* — Michael Maskulinski
(74) *Attorney, Agent, or Firm* — Peter H. Priest; Joseph P. Mehrle

(57) ABSTRACT

A fault replay system uploads part or all of a log file from a subject system and replays the events detailed within the log file upon physical copies of devices present in the subject system. The replay of the log file events aid the determination of at which event a fault occurred and improves the accuracy of fault determination.

20 Claims, 3 Drawing Sheets

FAULT REPLAY SYSTEM AND METHOD

FIELD OF THE INVENTION

The present invention relates to a fault replay system and method. More particularly, but not exclusively, it relates to a synchronous fault replay system and method. Even more particularly, but not exclusively, it relates to a synchronous fault replay system and method for a self-service terminal (SST).

BACKGROUND TO THE INVENTION

Fault diagnosis in highly complex and heavily used systems, such as automated teller machines (ATMs), is difficult in the situation where all of the applications executed on the system are provided by the system's vendor due to the diverse and complex nature of the interactions between software and hardware. The complexity of these interactions are increased further when applications run on the system are not provided by the system's vendor but are rather provided by the customer operating the system as the vendor has no control of the syntax and command set used by the customer derived application. This results in the diagnosis of faults with a component device of the system, or within the system's software stack, being extremely difficult to diagnose remotely. In particular, if the fault is associated with the system's software stack it could have occurred at any level from the device firmware to the customer derived application software itself. The diagnosis of such faults is notoriously problematic.

Attempts to diagnose these faults often requires an engineer to try and recreate the fault at a test system. This is labor intensive and is not guaranteed to reproduce the fault as there often too many interacting factors, such as historical device usage, gaps in log entries, etc., to allow the engineer to recreate the fault manually.

Another method used to determine the cause of the fault is the manual examination of log data and instrumentation detail from the failed device and log data of the device's software stack. Such manual examination of log data is labor intensive and, due to the high volume of data to be reviewed and the interaction of parameters, critical events can be overlooked. This can result in the fault being either misdiagnosed, or failing to be diagnosed.

SUMMARY OF THE INVENTION

According to a first aspect of the present invention there is provided a method of fault replay comprising the steps of:
i) generating at least one log file comprising request data issued from a software application to a subject device or application of a subject system, and at least one of response data and event data returned to the software application;
ii) coupling each entry in the log file with a timestamp;
iii) exporting at least a portion of the log file to a test system comprising a test device or application similar to a corresponding subject device or application present in the subject system; and
iv) replaying at least a portion of the exported log file on the test system with a delay between subsequent entries in the log file proportional to the period indicated by their respective timestamps such that activity of the test device or application follows that of the subject device or application recorded in the log file.

The method may comprise comparing the activity of the test device to corresponding data in the log file in order to identify differences therebetween.

The subject device may comprise a self-service terminal.

The software application may use an application programming interface (API). The term API is used herein to relate to a software package which specifies an interface and behavior of the identifiers specified in the interface. The API does not control how the behavior is implemented by entities external of the interface. The API may be CEN-XFS.

The method may comprise sensing a fault condition in a subject device or application prior to step (iii).

The method may comprise delaying the replay of subsequent entries in the log file by a period equal to the period indicated by their respective timestamps. This allows real-time play back of events.

The method may comprise delaying the replay of subsequent entries in the log file by a period less than the period indicated by their respective timestamps. This allows accelerated play back of events.

The method may comprise determining whether to export the whole or a portion of the log file to the test system automatically. The method may comprise determining which portion of the log file to export to the test system based upon the nature of a fault sensed. The method may comprise determining which portion of the log file to export at the subject system. The method may comprise determining which portion of the log file to import at the test system. The method may comprise determining which portion of the log file to export based upon rules relating to the nature of a fault sensed. The export of only part of the log file reduces the amount of data transmitted over the network, thereby not using unnecessary bandwith.

Furthermore, the export of only part of the log file reduces the number of events that are replayed, thereby reducing the time required to simulate a fault condition.

According to a second aspect of the present invention there is provided a fault replay system comprising:
a subject system comprising a plurality of subject devices and/or subject applications;
the subject system being arranged to generate a log file comprising request data issued from a software application to a subject device or application of a subject system, and at least one of response data and event data returned to the software application, wherein each entry in the log file is coupled to a timestamp;
a test system comprising at least one device or application that is a copy of at least one of the respective subject devices and/or applications; wherein
the subject system is arranged to export at least a portion of the log file to a test system comprising a test device or application similar to a corresponding subject device or application present in the subject system; and
the test system is arranged to replay at least a portion of the exported log file on the test system with a delay between subsequent entries in the log file proportional to the period indicated by their respective timestamps such that activity of the test device or application follows that of the subject device or application recorded in the log file.

The subject device may comprise a self-service terminal.

The software application may use an application programming interface (API). The term API is used herein to relate to a software package which specifies an interface and behavior of the identifiers specified in the interface. The API does not control how the behavior is implemented by entities external of the interface. The API may be CEN-XFS.

The subject device may comprise a controller arranged to sense a fault condition in a subject device or application prior to the export of at least part of the log file to the test system.

The test system may be arranged to delay the replay of subsequent entries in the log file by a period equal to the period indicated by their respective timestamps. The test system may be arranged to delay the replay of subsequent entries in the log file by a period less than the period indicated by their respective timestamps.

The subject system may be arranged to determine whether to export the whole or a portion of the log file to the test system automatically. The test system may be arranged to determine whether to import the whole or a portion of the log file automatically. The determination of whether to export the whole or a portion of the log file may be based upon the nature of a fault sensed. The determination of whether to export the whole or a portion of the log file may be based upon rules relating to the subject device in which a fault is sensed.

The system may comprise a network arranged to place the subject system and the test system in communication.

According to a third aspect of the present invention there is provided a test system comprising at least one device or application that is a copy of at least one of a respective subject devices and/or applications present on a subject system; wherein the test system is arranged to receive at least a portion of a log file exported from a subject system, the log file comprising request data issued from a software application to one of subject devices or applications of the subject system, and at least one of response data and event data returned to the software application, wherein each entry in the log file is coupled to a timestamp;
the test system is arranged to replay at least a portion of the exported log file on the test system with a delay between subsequent entries in the log file proportional to the period indicated by their respective timestamps such that activity of the test device or application follows that of the subject device or application recorded on in the log file.

The test system may be arranged to delay the replay of subsequent entries in the log file by a period equal to the period indicated by their respective timestamps. The test system may be arranged to delay the replay of subsequent entries in the log file by a period less than the period indicated by their respective timestamps.

The test system may be arranged to determine whether to import the whole or a portion of the log file automatically. The determination of whether to export the whole or a portion of the log file may be based upon the nature of a fault sensed. The determination of whether to export the whole or a portion of the log file may be based upon rules relating to the subject device in which a fault is sensed.

The subject device may comprise a self-service terminal.

According to a fourth aspect of the present invention there is provided software which when executed upon a processor of a subject system causes the subject system to: generate a log file comprising request data issued from a software application to a subject device or application of a subject system, and at least one of response data and event data returned to the software application;
couple each entry in the log file with a timestamp; and
export at least a portion of the log file to a test system comprising a test device or application similar to a corresponding subject device or application present in the subject system.

The software may comprise an application programming interface (API). The API may be CEN-XFS.

The software may be arranged to sense a fault condition in a subject device or application prior to causing the processor to export at least a portion of the log file to the test system. The software may be arranged to trigger the export of at least part of the log file upon sensing the fault condition.

The software may be arranged to trigger the export of at least part of the log file upon the processor receiving a request from the test system.

The software may be arranged to determine whether to export the whole or a portion of the log file to the test system automatically. The method may comprise determining which portion of the log file to export to the test system based upon the nature of a fault sensed. The method may comprise determining which portion of the log file to export based upon rules relating to the subject device in which a fault is sensed.

The subject device may comprise a self-service terminal.

According to a fifth aspect of the present invention there is provided software which when executed upon a processor of a test device causes the test system to receive at least a portion of a log file exported from a subject system, the log file comprising request data issued from a software application to one of the subject devices or applications of the subject system, and at least one of response data and event data returned to the software application, wherein each entry in the log file is coupled to a timestamp, the software further causing the test system to replay at least a portion of the exported log file on the test system with a delay between subsequent entries in the log file proportional to the period indicated by their respective timestamps such that activity of a test device or application of the test system follows that of the subject device or application recorded in the log file.

The software may cause the test system to delay the replay of subsequent entries in the log file by a period equal to the period indicated by their respective timestamps. The software may cause the test system to delay the replay of subsequent entries in the log file by a period less than the period indicated by their respective timestamps.

The software may cause the test system to determine whether to export the whole or a portion of the log file automatically. The determination of whether to export the whole or a portion of the log file may be based upon the nature of a fault sensed. The determination of whether to export the whole or a portion of the log file may be based upon rules relating to the subject device in which a fault is sensed.

The subject device may comprise a self-service terminal.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
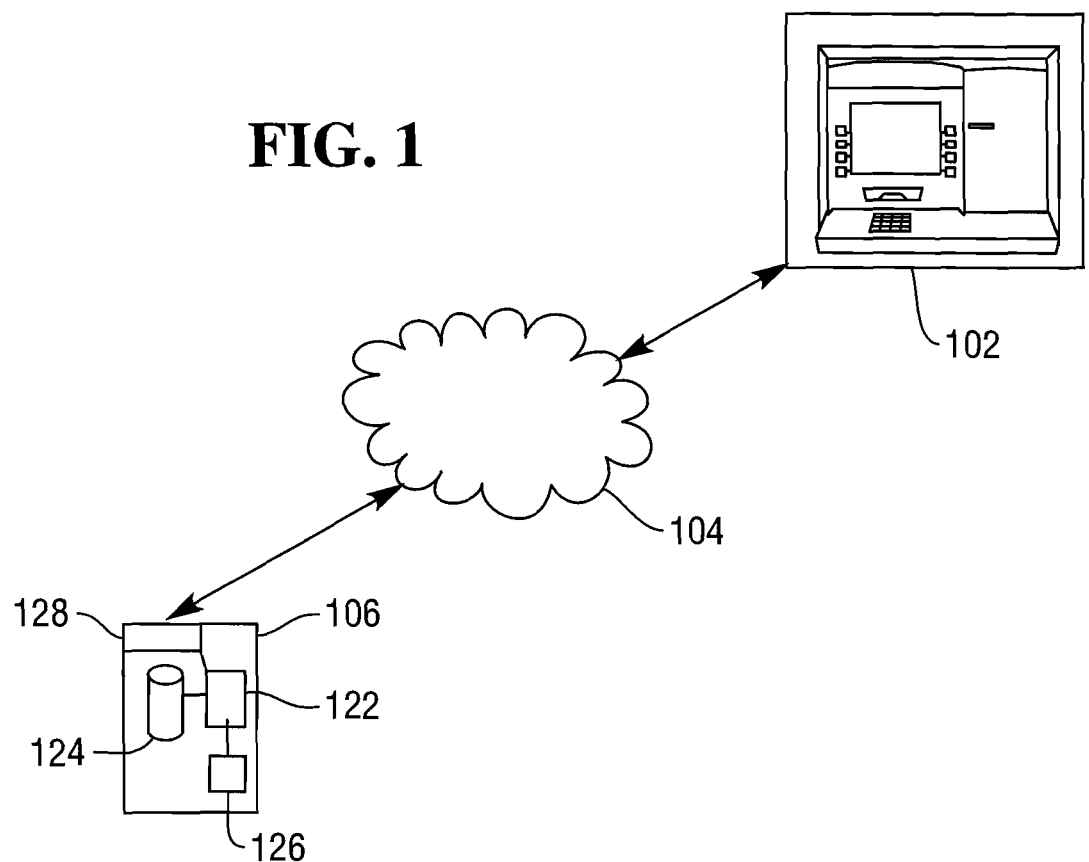
FIG. 1 is a schematic diagram of an embodiment of a fault replay system according to an aspect of the present invention.
Figure 2:
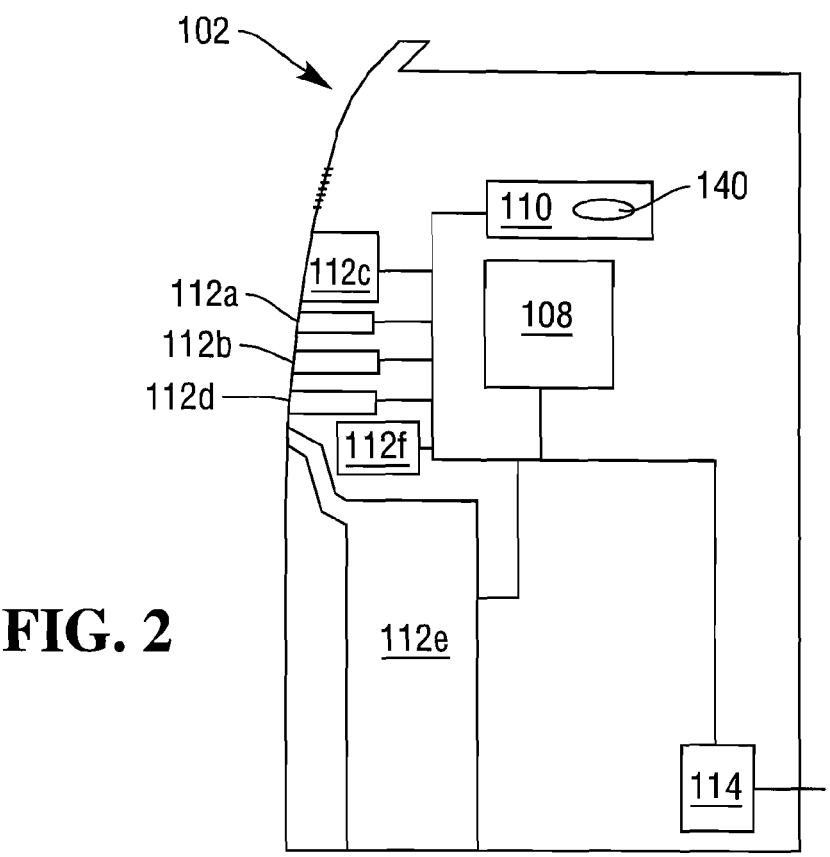
FIG. 2 is a schematic representation of an ATM of the system of FIG. 1.
Figure 3:
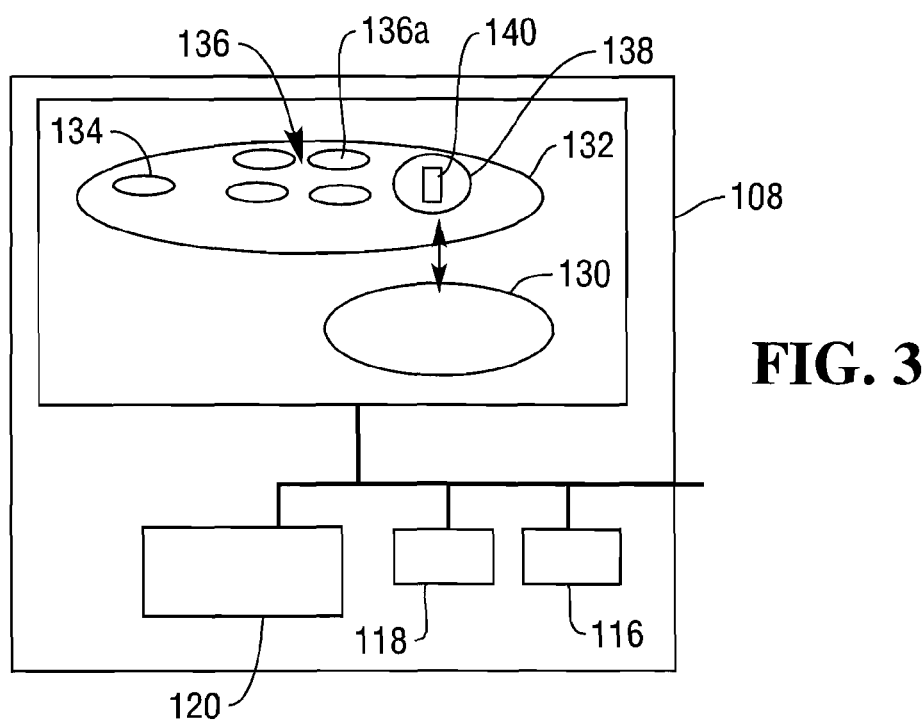
FIG. 3 is a schematic representation of a controller of the ATM of FIG. 2.

Referring now to FIGS. 1 to 4, a fault replay system 100 comprises an ATM 102, a network 104 and a test system 106.

The ATM 102 comprises a controller 108, a data storage device 110, a number of peripheral devices 112a-f, and a network connection 114. Typically, the control processor 108 is a PC core operating under a Microsoft Windows™ operating system. Normally, the data storage device 110 is a magnetic disc and may form part of the controller in some embodiments.

The controller 108 is typically a PC core running the Microsoft® Windows XP® system. The controller 108 comprises a BIOS 116 stored in non-volatile memory, a microprocessor 118 and associated main memory 120.

Typical peripheral devices found in the ATM 102 comprise, but are not limited to, a card reader device 112a, a receipt printer device 112b, a display 112c and associated function display keys (FDKs) 112d, an encrypting keypad 112f, and a dispenser device 112e.

The communications network 104 comprises a secure network over which transactions data for transactions executed at the ATM 102 passes to an authorization host (not shown) and can also connect the ATM 102 to test system 106 via the network connection 114.

The test system 106 comprises a controller 122, a data storage device 124, at least one peripheral device 126, for example an encrypting keypad, and a network connection 128. The controller 122 of the test system 106 is analogous to that of the ATM 102, except that the controller 122 runs software to replay the events contained in the log file.

In use, the ATM controller 102 loads an operating system kernel 130 and an ATM application program 132, for example the APTRA XFS platform available from NCR Corporation of Dayton Ohio, into the main memory 120. The ATM application program 132 acts as an API mediating communications between the controller 108 and the peripheral devices 112a-f.

The application program 132 comprises a suite of routines and objects 134 for controlling the operation of the ATM 102 such as providing the sequence of screens used in each transaction. The application program 132 also comprises a number of service providers 136, in the case of APRTA XFS these will be CEN XFS service providers. The service providers 136 control at least one, possibly many, of the peripheral devices 112a-f, and/or applications running on the ATM 102. For example the service provider 136a relates to the encrypting keypad 112f drives requests for both an encryptor device and a keyboard device that comprise the keypad 112f. The service providers 136 drive requests from the controller 108 to the peripheral devices 112a-f. For example the service provider 136a relates to the encrypting keypad 112f drives requests for both an encryptor device and a keyboard device that comprise the keypad 112f.

Typically, the driving of requests involves translating any proprietary communications, command data and/or response data required to drive the peripheral device 112a-f and monitor its performance. In an exemplary embodiment utilizing the CEN XFS standard, the standard defines a programming standard for communicating with each individual class of CEN XFS service provider 136, such that expected requests, excepted responses and events associated with each service provider 136 are defined.

The application program 132 also comprises a trace log routine 138 that logs trace points in a log file 140. The trace points comprising the log file 140 are indicative of data sent between the service providers 136 and the ATM application 132, and the data sent between the service providers 136 and the peripheral devices 112a-f that has been converted into suitable respective formats for use by device drivers of the peripheral devices 112a-f. The log file 140 is stored on the data storage device 110.

A typical trace point entry in the log file 140 for an encrypting PIN pad is shown below:
(Date)04.09.2008 (Time)11:48.30,983 (i)
XFS PIN Service Provider, XFS-DeviceControl (ii)
<FREE>Worker hService: 19 (0x00000013), RequestId: 2292 (0x000008f4)</FREE> (iii)
<F>MultiStateControllerImpl::MultiStateControllerImpl</F> (iv)
<SCFILE>ControllerImpl.cpp</SCFILE> (v)
<SCLINE>135</SCLINE> (vi)

Taking each line of the trace point in turn:
(i) is a date and timestamp associated with the tracepoint;
(ii) describes the device name of the XFS Service Provider (XFS PIN Service Provider) and the logical unit with in the XFS Service Provider that recorded the trace point (XFS-DeviceControl);
(iii) are contextual extensible mark-up language tags employed in analysis of the trace file, in particular, this line details that the thread of execution is a worker thread and the XFS session label for this service provider is number 19, with this particular request being the $2292^{nd}$ request of the session sent to this particular service provider;
(iv) details the source code function that recorded the trace point;
(v) identifies the source file that contains the source function that recorded the trace point; and
(vi) details the line of the source code in the source file that contains the source function that recorded the trace point.

Thus, from the above exemplary trace point it can be determined that: on 4 Sep. 2008 at 11:48:30.983 the XFS PIN Service Provider Device control created a MultiState controller for session 19 and request id 2292. The line of code running was at line 135 in source file ControllerImpl.cpp. The log file 140 contains trace points for each request, response and event handled by the application 132 and consequently may run to hundreds of thousands of trace points.

In the event of a device failure the application 132 flags the device failure and the controller 108 opens a communications channel via the ATM's network connection 114 and the network 104 to the test system 106. In one embodiment of the present invention, an operator of the test system 106 determines whether to upload all of the trace file or part of the log file 140 from the data storage device 110 based upon their experience. In an alternative embodiment, the determination whether to upload part, or all, of the log file 140 may be made automatically by the controller 122 of the test system 106. Such an automated determination may be based upon the nature of the fault or the device upon which the fault occurred. For example, a fault with the card reader 112a may require only those log entries relating to the use of the card reader 112a immediately prior to the fault and the fault occurrence of the card reader 112a and controller 108 to be uploaded. In a further example, a certain fault with the keypad 112f may require the upload of log entries relating to a series of uses of the keypad 112f components both the encryptor device 112f'' and the keypad 112f''', along with their respective communications to and from the controller 108, due to the sequential nature of keypad usage, and card reader 112a data as the data from the card reader can feed into controller operations related to the keypad 112f.

The test system 106 is configured with at least some of the peripheral devices 112a-f present at the ATM 102. In some instances the test system 106 will comprise copies of all of the peripheral devices 112a-f present at the ATM 102. In other instances only copies of those peripheral devices 112a-f considered to be required to emulate the device failure are present at the test system 106.

As noted hereinbefore the controller 122 of the test system 106 is analogous to that of the ATM 102; except in that it runs a software routine 142 that allows the replay of entries in the log file 140: Thus, when run, the software routine 142 causes all system calls, request, response and event detailed in the trace points that comprise the part of log 140 uploaded to the test system 106 to be carried out in a synchronous manner. The controller 122 of the test system reads trace points in from the log 140 and issues commands to the attached peripheral devices such that the peripheral devices execute those commands in a synchronous manner. The controller 122 logs the responses received from the attached peripheral devices such that a comparison is executed between the responses received from the peripheral devices and those in the log file received from the ATM, with any difference being flagged by the controller 122. Typically, the controller 122 generates a file containing details of the differences, such as the device to which the differences relates and the line of the source code to which the action relates. This is because any difference between the responses and the log file is indicative of a fault at the ATM. In a preferred embodiment, the controller 122 identifies the point of failure from these difference. The ability to recognize faults can be present in the controller 122 as produced or the recognition of patterns of faults may be learnt, as an expert system. In an alternative, or additional embodiment. These differences can be used by an engineer to determine what the fault is, this speeds up the fault determination process over the previous solution of scanning the whole log file.

The term synchronous as used herein relates to the execution of actions corresponding trace point entries in the log file 140 in the order that they were carried out at the ATM 102, and where time periods between the execution subsequent actions corresponding to entries in the log file 140 are proportional to the actual time period defined by difference in timestamps of respective entries in the log file.

Typically, but not exclusively, the events contained in the log file 140 will be replayed in real-time where the time periods between the execution subsequent actions corresponding to entries in the log file 140 are equal to the actual time period defined by difference in timestamps of respective entries in the log file. The replay of events contained in the log file 140 at the test system 106 allows the fault that occurred at the ATM 102 to be recreated locally at the test system 106. Typically, the test system 106 is remote from the ATM 102, for example it may be in a different city, or even country from the ATM 102.

The log file 140 and the test log file can be compared to look for differences in the responses issued by the peripheral devices to the requests issued from the controller 122.

Furthermore, updated software can be cross-checked prior to release by verifying that the execution of updated software on the test system 106 generates the same trace point data as a previous version that is known to execute on an ATM. This can be effected by storing a trace point log file relating to the previous software release executed on the ATM locally at the test system 106.

Figure 4:
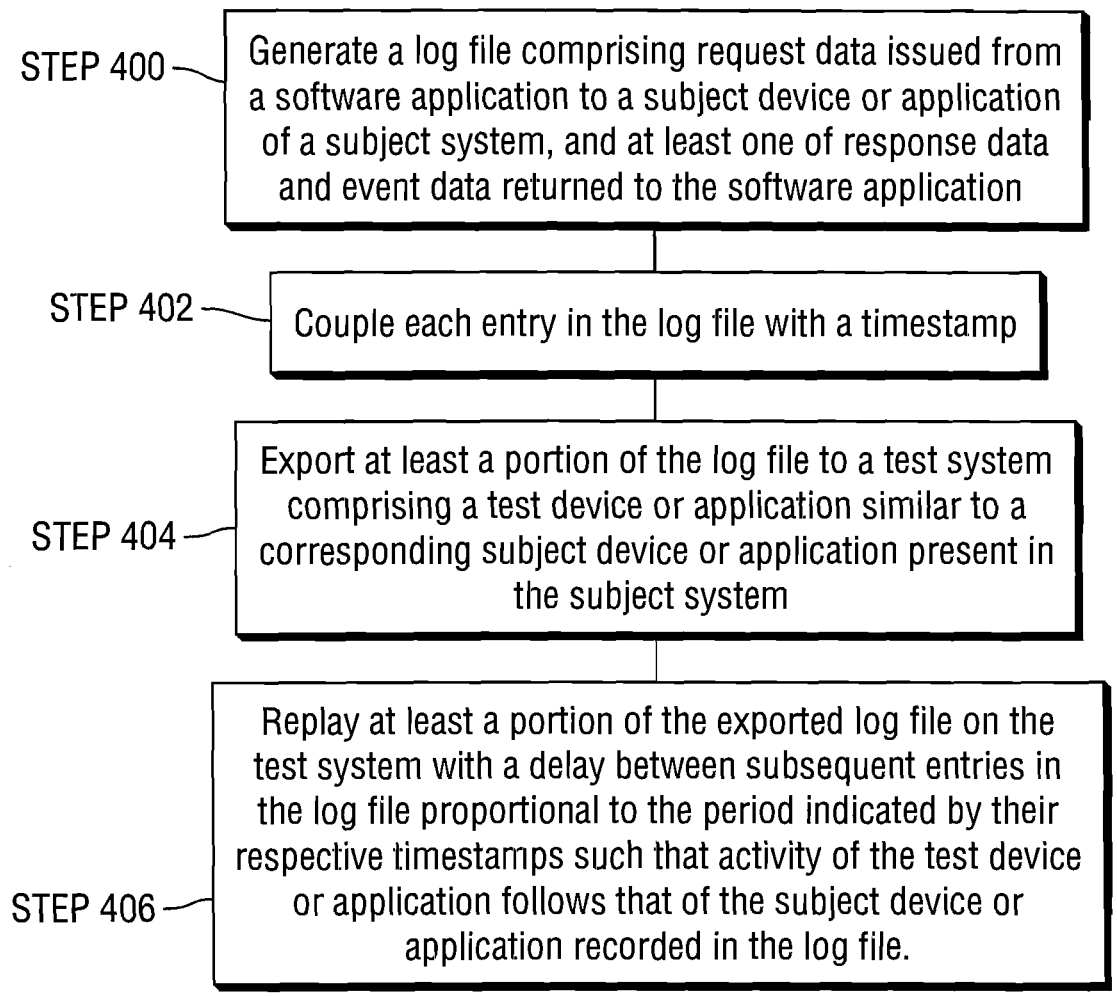
FIG. 4 is a flow chart showing steps of a method of according to an aspect of the present invention.

Referring now to FIG. 4, a method of fault replay comprises generating a log file comprising request data issued from a software application to a subject device or application of a subject system, and at least one of response data and event data returned to the software application (Step 400). Each entry in the log file is coupled with a timestamp (Step 402). A portion of the log file is exported to a test system which comprise a test device or application similar to a corresponding subject device or application present in the subject system (Step 404). At least a portion of the exported log file is replayed on the test system with a delay between subsequent entries in the log file proportional to the period indicated by their respective timestamps such that activity of the test device or application follows that of the subject device or application recorded in the log file (Step 406).

It will be appreciated that the log file may be retained locally at the ATM subsequently downloaded on to a data carrier, such as a USB drive, CD or DVD. The data carrier is then used to load the log file on to the test system for replay. Although the embodiments of the present invention detailed hereinbefore are described with reference to an encrypting key pad the skilled person will realize that the teachings of the present invention are applicable to any peripheral device or application driven via a service provider of the ATM application.

It will be appreciated that although described with reference to a single ATM, the present invention is equally applicable to a network of ATMs in which data to be replayed at the test system is selectively downloaded from a specific ATM in the event of a fault or failure of a peripheral device and/or application of said ATM.

It will be further appreciated that although described with reference to an ATM the present invention is applicable to any suitable self-service terminal (SST) or network of SSTs. Examples of suitable SSTs include, but are not limited to, an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

It will also be appreciated that the steps of the methods described herein may be carried out in any suitable order, or simultaneously where appropriate. The methods described herein may be performed by software in machine readable form on a tangible storage medium or as a propagating signal.

As described herein the SST comprises one or more modules each of which is operable to perform at least one specific function. Typically, the module implements its function either in response to a customer action and/or a command received from a PC core (which is also a module) of the SST. Non-limiting examples of modules include: display, card reader, journal printer, rear operator panel, encrypting keypad, PC core, cash dispenser etc.

Typically, each module comprises a processor to enable the module to perform its function, and a communications facility to enable the module to communicate with the controller, but in some instances this may not be essential.

Each module comprises one or more devices that contributes to the execution of the module's respective function. Typically, each device comprises a replaceable part within the module. Non-limiting examples of devices include: for the display module, a display panel, a display panel housing, and the like; for a cash dispense module, a note thickness sensor, a pick unit, a presenter unit, and the like.

Each device comprises one or more components configured to enable the device to contribute to the execution of the module's function. Non-limiting examples of components include: for a motorized card reader module, a width switch, a shutter, a pre-read magnetic head, a magnetic stripe reading head, and the like.

Various modifications may be made to the above described embodiment without departing from the spirit and the scope of the invention.

The invention claimed is:

1. A method of fault replay for a self-service terminal employing a number of end-user interface peripheral devices in performing self-service terminal transactions for end users, the method comprising the steps of:
   i) generating a log file comprising request data issued from a software application located in the self-service terminal and controlling operation of the self-service terminal to a subject device or application of the self-service terminal, and at least one of response data and event data for at least one of the number of end-user interface peripheral devices returned to the software application, the at least one of the number of end-user interface peripheral devices comprising a display screen controlled to provide a sequence of screens used in each transaction performed by the self-service terminal;

ii) coupling each entry in the log file with a timestamp;

iii) exporting at least a portion of the log file to a test system comprising a test device or application similar to a corresponding subject device or application present in the self-service terminal and emulating failure of the corresponding subject device or application present in the self-service terminal, by the test system, on failure by the corresponding subject device or application present in the self-service terminal;

iv) replaying at a user determined time at least a portion of the exported log file on the test system with a delay between subsequent entries in the log file proportional to the period indicated by their respective timestamps such that activity of the test device or application follows that of the subject device or application recorded in the log file; and v) executing a comparison between responses received from the test device or application and those in the log file received from the self-service terminal.

2. The method of claim 1, wherein the software application comprises an application programming interface (API).

3. The method of claim 1 comprising sensing a fault condition in a subject device or application prior to step (iii).

4. The method of claim 1 comprising delaying the replay of subsequent entries in the log file by a period equal to the period indicated by their respective timestamps.

5. The method of claim 1 comprising determining whether to export the whole or a portion of the log file to the test system automatically at the subject system based upon evaluation of a detected fault at the self-service terminal.

6. The method of claim 1 comprising determining which portion of the log file to export based upon rules relating to the nature of a fault sensed.

7. The method of claim 1, wherein the subject device comprises a self-service terminal.

8. The method of claim 1 wherein the number of end-user peripheral devices comprise a card reader device, a receipt printer, an encrypting keypad, and a dispenser device.

9. The method of claim 8 wherein the at least one of response data and event data comprises data for the card reader device, the receipt printer, the display, the encrypting keypad, and the dispenser device.

10. The method of claim 1 further comprising:
generating a test log file upon replaying the at least a portion of the exported log file.

11. The method of claim 10 further comprising:
comparing the test log file and the exported log file and flagging any differences.

12. The method of claim 1 wherein the step of exporting at least a portion of the log file further comprises downloading the portion of the log file on to a data carrier and loading the portion of the log file from the data carrier to the test system.

13. A test system for testing a self-service terminal employing a number of end-user interface peripheral devices in performing self-service terminal transactions for end users, the test system comprising at least one test device or application that is a copy of at least one of respective subject devices or applications present on the self-service terminal; wherein the test system is arranged to receive at least a portion of a log file exported from the self-service terminal, the log file comprising request data issued from a software application controlling operation of the self-service terminal to one of the subject devices or applications of the self-service terminal, and at least one of response data and event data for at least one of the number of end-user interface peripheral devices returned to the software application, wherein each entry in the log file is coupled to a timestamp, the at least one of the number of end-user interface peripheral devices comprising a display screen controlled to provide a sequence of screens used in each transaction performed by the self-service terminal;

the test system is arranged to replay at a user determined time at least a portion of the exported log file on test system with a delay between subsequent entries in the log file proportional to the period indicated by their respective timestamps such that activity of the test device or application follows that of the subject device or application recorded in the log file, wherein the test system is configured to emulate failure of one of the subject devices or one of the applications of the self-service terminal on failure of that subject device or that application; and the test system executes a comparison between responses received from the test device or application and those in the log file received from the self-service terminal.

14. The test system of claim 13 wherein a controller is arranged to delay the replay of subsequent entries in the log file by a period equal to the period indicated by their respective timestamps.

15. A fault replay system comprising:
a test system comprising at least one device or application that is a copy of at least one of a plurality of subject devices or subject applications present on a subject system comprising a self-service terminal; wherein the test system is arranged to receive at least a portion of a log file exported from the subject system, the log file comprising request data issued from a software application controlling operation of the self-service terminal to one of the subject devices or applications of the subject system, and at least one of response data and event data returned to the software application, wherein each entry in the log file is coupled to a timestamp, and wherein the test system is configured to emulate failure of one of the subject devices or one of the subject applications on failure of that device or that application;

the test system is arranged to replay at a user determined time at least a portion of the exported log file on the test system with a delay between subsequent entries in the log file proportional to the period indicated by their respective timestamps such that activity of the test device or application follows that of the subject device or application recorded in the log file;

the self-service terminal employing end-user interface peripheral devices in performing self-service terminal transactions for end users; wherein the subject system is arranged to generate a log file comprising request data issued from a software application to a subject device or application of a subject system, and at least one of response data and event data for at least one of the end-user interface peripheral devices is returned to the software application, at least one of the end-user interface peripheral devices comprising a display screen controlled to provide a sequence of screens used in each transaction performed by the self-service terminal, and wherein the subject system is arranged to export the at least a portion of the log file to the test system; and the test system executing a comparison between responses received from the test device or application and those in the log file received from the self-service terminal.

16. A computer program product comprising non-transitory computer-readable media storing computer executable instructions which when executed upon a processor of a test system causes the test system to receive at least a portion of a log file exported from a subject system comprising a self-service terminal employing a number of end-user interface peripheral devices in performing self-service terminal transactions for end users, the log file comprising request data issued from software of the self-service terminal to one of the end-user interface peripheral devices, the at least one of the number of end-user devices comprising a display screen controlled to provide a sequence of screens used in each transaction performed by the self-service terminal, and at least one of response data and event data for at least one of the number of end-user interface peripheral devices returned to the software, wherein each entry in the log file is coupled to a timestamp, the software further causing the test system to replay at least a portion of the exported log file on the test system with a delay between subsequent entries in the log file proportional to the period indicated by their respective timestamps such that activity of a test device of the test system follows that of a subject device or an application recorded in the log file, wherein the test system replay emulates failure of one of the end-user interface peripheral devices on failure by that end-user peripheral device, and the software further causing the test system to execute a comparison between responses from the test device and responses for the subject device in the log file.

17. The computer program product of claim 16 which when executed upon the processor causes the test system to delay the replay of subsequent entries in the log file by a period equal to the period indicated by their respective timestamps.

18. The computer program product of claim 16 which when executed upon the processor causes the test system to determine whether to import the whole or a portion of the log file automatically.

19. The computer program product of claim 16 which when executed upon the processor causes the determination of whether to import the whole or a portion of the log file to be based upon the nature of a fault sensed.

20. The computer program product of claim 16 which when executed upon the processor causes the determination of whether to import the whole or a portion of the log file to be based upon rules relating to the subject device in which a fault is sensed.

* * * * *